United States Patent [19]  
Otowa

[11] Patent Number: 5,064,805  
[45] Date of Patent: Nov. 12, 1991

[54] PRODUCTION OF HIGH QUALITY ACTIVATED CARBON

[75] Inventor: Yoshiro Otowa, Amagasaki, Japan

[73] Assignee: Kansai Netsukagaku Kabushiki Kaisha, Amagasaki, Japan

[21] Appl. No.: 414,788

[22] Filed: Sep. 29, 1989

[30] Foreign Application Priority Data

Oct. 1, 1988 [JP] Japan .................................. 63-248754

[51] Int. Cl.$^5$ ....................... C01B 31/12; B01J 20/20; B01J 21/18
[52] U.S. Cl. ........................................ 502/427; 55/74; 502/180; 502/437
[58] Field of Search ............... 502/427, 437, 417, 418, 502/419

[56] References Cited

U.S. PATENT DOCUMENTS

| 2,835,343 | 5/1958 | Wolff et al. | 502/427 |
| 3,624,004 | 4/1971 | Wennerberg | 502/437 |
| 3,642,657 | 2/1972 | Wennerberg et al. | 201/25 |
| 3,764,561 | 10/1973 | Hishino et al. | 502/427 |
| 3,817,874 | 6/1974 | Wennerberg et al. | 423/460 |
| 3,833,514 | 9/1974 | Wennerberg et al. | 423/449 |
| 3,876,505 | 4/1975 | Stomeburner | 205/8 |
| 4,014,817 | 5/1977 | Johnson et al. | 423/445 |
| 4,082,694 | 4/1978 | Wennerberg | 502/427 |
| 4,769,359 | 9/1988 | Audley et al. | 502/418 |

Primary Examiner—Paul E. Konopka  
Attorney, Agent, or Firm—Armstrong, Nikaido, Marmelstein, Kubovcik & Murray

[57] ABSTRACT

The invention relates to a method of producing activated carbon with a large surface area and a low sulfur content. Coconut shell char, as a carbonaceous material, is mixed with granular potassium hydroxide hydrate with a water content of 2 to 25 weight %, as an activator, in a weight ratio of 1:2 through 1:6 and the mixture is heat-treated at a temperature necessary for activation.

4 Claims, No Drawings

PRODUCTION OF HIGH QUALITY ACTIVATED CARBON

BACKGROUND OF THE INVENTION

1. Field of the Invention

The present invention relates to a method for producing high quality activated carbon with a large surface area and a very low sulfur content.

2. Brief Description of the Prior Art

Activated carbon having a BET specific surface area in excess of 2000 $m^2/g$ is useful for various purposes, such as fractionation of hydrocarbons, purification of industrial gases, anti-pollution devices, liquid-phase purification processes in food and chemical industries, water treatment, liquid-phase recovery and separation processes, catalysts and catalyst supports, and so on.

As a technology for producing such activated carbon having a large surface area, the following potassium hydroxide activation process has been proposed.

Japanese Patent Publication No. 61529/1987 describes a process for producing activated carbon with a BET specific surface area in excess of 2300 $m^2/g$, which starts with petroleum coke or a mixture thereof with coal as the carbonaceous material, and comprises blending this carbonaceous material with granular potassium hydroxide hydrate, dehydrating the blend in a preliminary calcining furnace at an elevated temperature of about 315.6° C. (600° F.) to 482.2° C. (900° F.) and activating the same in a calcining furnace at an elevated temperature of about 704.4° C. (1300° F.) to 982.2° C. (1800° F.).

In fact, the activated carbon obtained by the above process has a large BET surface area of 2300 $m^2/g$ or more. However, our verification studies and analysis revealed that this activated carbon had a total sulfur content of about 0.3 weight percent and, when used as a catalyst support, presented the problem that the catalyst was poisoned.

The amount of sulfur contained in activated carbon can be decreased by washing the carbon with an acid, but the ultimate sulfur level after repeated acid washing is only about one-third of the initial total sulfur level at best. It is commercially impossible to reduce the total sulfur content to less than 0.01 weight percent (100 ppm). Furthermore, repeated acid washing means a high production cost and cannot be practiced commercially if only from this point of view.

It is, therefore, the object of the present invention to provide a commercially useful method for producing activated carbon having a large surface area and a very low sulfur content.

SUMMARY OF THE INVENTION

The present invention relates to a method of producing activated carbon with a large surface area and a low sulfur content, which starts with coconut shell char as a carbonaceous material and potassium hydroxide hydrate with a water content of 2 to 25 weight percent as an activator. The present invention comprises blending said coconut shell char and potassium hydroxide hydrate in a weight ratio of 1:2 through 1:6 and heat-treating the blend at an activating temperature.

DETAILED DESCRIPTION OF THE INVENTION

In accordance with the present invention, coconut shell char is used as the carbonaceous material. Coconut shell char is not only characterized by a low sulfur content but has the property to lose sulfur readily in the course of activation with potassium hydroxide hydrate.

The grain size of coconut shell char may be fairly coarse, e.g. 10 mesh pass through >100 mesh pass, but an activated carbon with a very large surface area can be obtained when the char substantially not larger than 100 mesh pass, preferably not larger than 200 mesh pass, is used. The term "substantially" as used herein means that not less than about 80 weight percent, or preferably not less than 90 weight percent, of all the char particles pass the specified mesh.

As the activator for coconut shell char, potassium hydroxide hydrate with a water content of 2 to 25 weight percent is used. Potassium hydroxide hydrate with a water content in this range melts at a temperature of about 200° to 250° C. (which is lower than the melting point of potassium hydroxide, which is 360° C.), to give a thoroughly clear colorless liquid which insures good contact with coconut shell char. If the water content is less than 2 weight percent, the high melting temperature required detracts from workability, while potassium hydroxide hydrate with a water content over 25 weight % is inadequate in activating power.

The blending ratio of coconut shell char to potassium hydroxide hydrate is selected from the range of 1:2 through 1:6 by weight and preferably 1:3 through 1:5 by weight. If the proportion of potassium hydroxide hydrate is too small, the degree of activation will not be as high as desired, while the use of an exceedingly large excess of potassium hydroxide hydrate will make the activated carbon fragile.

The preferred procedure for blending coconut shell char with potassium hydroxide hydrate comprises charging a calciner first with granular potassium hydroxide hydrate, melting it by heating at a temperature beyond its melting point and adding coconut shell char to the melt. This procedure offers the most efficient contact of the two materials. It is also possible to charge a calciner with both coconut shell char and granular potassium hydroxide hydrate at one time and then melt the latter by heating.

After this blending of coconut shell char and potassium hydroxide hydrate, the mixture is heat-treated at a temperature conducive to activation of the char. This temperature is generally not lower than 480° C. and particularly in the range of 500° to 900° C.

The trend is that the higher the heating temperature, the larger the surface area of the product activated carbon. However, increasing the temperature too much results in a proportional decrease in the yield of activated carbon and imposes rigorous limitations on calciner refractory material.

On the other hand, the use of a relatively low heating temperature of 480° to 690° C. tends to yield a somewhat smaller surface area but insure an improved yield of activated carbon and imposes only moderate restrictions in respect of calciner refractory material.

Therefore, the heating temperature should be optimized with reference to such factors as the required quality specifications and uses of activated carbon.

The heat treatment may be carried out at a constant temperature or according to an incremental schedule.

During the heating procedure, the system is stirred either intermittently or continuously. This heat treatment may be a batch process or a continuous one.

After completion of the heat treatment, the activated carbon is withdrawn from the calciner, rinsed and dried to give a finished product. It may be further granulated. Since the dry activated carbon tends to give rise to dust, it is preferably stored in hydrous state (for example, in a condition containing about 50 weight % of water). The potassium hydroxide can be recovered, concentrated and reused.

The activated carbon according to the present invention can be used in a variety of applications such as fractionation of hydrocarbons, purification of industrial gases, anti-pollution devices, liquid-phase purification processes in food and chemical industries, water treatment, liquid-phase recovery and separation, catalysts or catalyst supports, batteries, analysis, medicinal uses and so on.

When a mixture of coconut shell char and potassium hydroxide hydrate is heat-treated at an activating temperature, dehydration of the coconut shell char and potassium hydroxide hydrate and activation of the char take place in succession to give an activated carbon with a large surface area. Concurrently with this activation, the sulfur occurring in the coconut shell char is extracted into the molten potassium hydroxide.

Since the sulfur originally contained in coconut shell char is small in amount and is efficiently extracted out in the course of potassium hydroxide activation, the sulfur content of product activated carbon is as low as 0.01 weight percent (100 ppm) at most. This remarkable desulfurizing effect cannot be achieved by using any other carbonaceous material and/or the conventional activating technology.

In accordance with the present invention, activated carbon with a large surface area and a minimum of sulfur, not more than 100 ppm of sulfur, can be produced with advantage on a commercial scale.

This activated carbon not only has a large surface area but is substantially free of sulfur so that it can be advantageously used in an extended spectrum of applications inclusive of a catalyst support.

DESCRIPTION OF THE PREFERRED EMBODIMENT

The following examples are further illustrative of the present invention. It should be understood that all parts and percents, excepting percent yields, are by weight, and that various determinations were made under the following conditions.

The yield of activated carbon is the value for the product dried at 115° C.

The total sulfur was determined by the combustion method (JIS M8813).

The bulk density was measured by filling 10 g of each sample into a 100 ml measuring cylinder, shaking it well and making the determination.

The BET specific surface area was determined by BET plotting (multiple-point method) within the range of $P/P_o = 0.006$ to 0.1.

The total pore volume was determined from the amount of nitrogen adsorbed within the range of $P/P_o = 0$ to 0.931 at the temperature of liquefied nitrogen.

The micropore volume was calculated by subtracting the pore volume of $\gamma > 10$ Å (Cranston Inkley's method) from the total pore volume.

The amount ml/g) of methylene blue adsorbed 1 was determined by the method of JIS K1470.

The amount (mg/g) of methylene blue adsorbed 2 is the amount of methylene blue adsorbed when 1 g of activated carbon was added to 1 l of a solution containing 1 g of methylene blue.

The amount of iodine adsorbed 1 is the amount of iodine adsorbed when 0.5 g of a sample was added to 50 ml of 0.1N iodine solution (JIS K1470).

The amount of iodine adsorbed 2 is the equilibrium amount of adsorption in 0.02N iodine solution.

The amount of benzene adsorbed is the value calculated from the saturation amount of adsorption when a benzene-saturated water vapor (12.5%) at 25° C. is diluted 10-fold and passed (JIS K1470).

EXAMPLE 1

A vertical calciner equipped with a stirrer, heating means and nitrogen inlet means was charged with 400 parts of granular potassium hydroxide hydrate with a water content of 15% and heated gradually to 200° C. over a period of 60 minutes. By this procedure the potassium hydroxide hydrate was melted completely to give a clear colorless liquid.

After the system was purged with nitrogen gas, 100 parts of coconut shell char (country of origin: Philippines; water content 3%, total sulfur about 200 ppm) of 400 mesh pass was added to the above melt at 200° C. and the mixture was stirred.

Then, with nitrogen gas introduced, the system was heated to an internal temperature of 500° C. and the dehydration reaction was conducted at this temperature for about 1 hour. After the evolution of water vapor had subsided, the system was further heated to 800° C. and the activation reaction was carried out at this temperature for 100 minutes.

After the above activation treatment, the product carbon was withdrawn from the calciner and cooled close to room temperature. Then, the product was rinsed with several portions of water to remove the potassium hydroxide.

When no more alkali was detected in the aqueous washings, the product was drained and dried in a hot air dryer at 110° C.

The activated carbon thus obtained was subjected to the determinations of yield, sulfur content, physical properties and adsorption capacity. The results are set forth below.

| | |
|---|---|
| Yield of activated carbon | 60% |
| Total sulfur | 86 ppm |
| Bulk density | 0.30 |
| BET specific surface area | 2680 m$^2$/g |
| Total pore volume | 1.68 ml/g |
| Micropore volume | 0.37 ml/g |
| Amount of methylene blue adsorbed 1 | 510 ml/g |
| Amount of methylene blue adsorbed 2 | 860 mg/g |
| Amount of iodine adsorbed 1 | 1200 mg/g |
| Amount of iodine adsorbed 2 | 2400 mg/g |
| Amount of benzene adsorbed | 150% |

EXAMPLE 2

The activated carbon obtained in Example 1 was immersed in 10 volumes of 3% hydrochloric acid, recovered by filtration and rinsed. The total sulfur concentration after the above treatment was 69 ppm.

COMPARATIVE EXAMPLE 1

A rotary preliminary calciner was charged with 100 parts of petroleum coke (Lake Charles, U.S.A., volatile matter 12%, total sulfur about 4.9%) and 400 parts of granular potassium hydroxide hydrate with a water content of 15%. In a nitrogen gas atmosphere, the system was heated to 385° C. and the dehydration treatment was carried out at this temperature for about 1 hour with constant stirring.

The product was then transferred to a rotary calciner, in which activation was carried out for 2 hours at a temperature of about 840°-845° C. in a nitrogen gas stream under rotary agitation.

The product was cooled, rinsed thoroughly with water and dried in a vacuum oven at 110° C.

The resulting activated carbon was subjected to the determinations of yield, sulfur content, physical properties and adsorption capacity. The results are set forth below.

| | |
|---|---|
| Yield of activated carbon | 63% |
| Total sulfur | 2900 ppm |
| Bulk density | 0.29 |
| BET specific surface area | 3350 m$^2$/g |
| Total pore volume | 1.96 ml/g |
| Micropore volume | 0.62 ml/g |
| Amount of methylene blue adsorbed 1 | 530 ml/g |
| Amount of methylene blue adsorbed 2 | 990 mg/g |
| Amount of iodine adsorbed 1 | 1200 mg/g |
| Amount of iodine adsorbed 2 | 2800 mg/g |
| Amount of benzene adsorbed | 148% |

COMPARATIVE EXAMPLE 2

The activated carbon prepared in Comparative Example 1 was immersed in 10 volumes of 3% HCl for 1 hour, recovered by filtration and rinsed. The total sulfur concentration after the above treatment was 950 ppm.

The activated carbon thus treated was further immersed in 10 volumes of 3% HCl for 3 days but the total sulfur level was reduced only to 930 ppm. Thus, very rigorous treatment was necessary for reducing the total sulfur to less than 100 ppm.

COMPARISON OF EXAMPLES 1 AND 2 WITH COMPARATIVE EXAMPLES 1 AND 2

While the activated carbons of Examples 1 and 2 and those of Comparative Examples 1 and 2 were invariably excellent in various physical properties and adsorption capacity, the products of Examples 1 and 2 were definitely superior to those of Comparative Examples 1 and 2 in terms of sulfur content.

TABLE 1

| | (total sulfur, ppm) | | |
|---|---|---|---|
| | No. of HCl washing steps | | |
| | 0 | 1 | 2 |
| Examples 1 and 2 | 86 | 69 | — |
| Comparative Examples 1 and 2 | 2900 | 950 | 930 |

EXAMPLE 3

The procedure of Example 1 was repeated except that the activation treatment was carried out at 670° C. for 100 minutes. The results were as follows.

| | |
|---|---|
| Yield of activated carbon | 68% |
| Total sulfur | 90 ppm |
| Bulk density | 0.34 |
| BET specific surface area | 2540 m$^2$/g |

Comparison of the above data with those of Example 1 revealed that while the specific surface area was somewhat sacrificed because of the lower activation temperature used, the yield and bulk density were rather increased.

EXAMPLE 4

The procedure of Example 1 was repeated except that the system was continuously stirred at a speed of 120 rpm throughout the entire course of dehydration and activation. The results were as follows.

| | |
|---|---|
| Yield of activated carbon | 55% |
| Bulk density | 0.30 |
| BET specific surface area | 3050 m$^2$/g |

EXAMPLE 5

The procedure of Example 3 was repeated except that the system was continuously stirred at a speed of 120 rpm throughout the entire course of dehydration and activation. The results were as follows.

| | |
|---|---|
| Yield of activated carbon | 62% |
| Bulk density | 0.32 |
| BET specific surface area | 2680 m$^2$/g |

EXAMPLE 6

A vertical calciner equipped with a stirrer, heating means and nitrogen inlet means was charged with 400 parts of granular potassium hydroxide with a water content of 15% and the temperature was increased to 200° C. over 60 minutes. By this procedure the potassium hydroxide hydrate was melted to give a thoroughly clear colorless liquid.

After the system was purged with nitrogen gas, 100 parts of coconut shell char (country of origin: Phillippines, water content 2%, total sulfur about 200 ppm) in the size range of 10 to 32 mesh was added to the above solution at 400° C. and stirred.

Then, in a stream of nitrogen gas, the system was heated at an internal temperature of 400° C. for dehydration. After about one hour when the evolution of water vapor had subsided, the system was further heated at 500° C. for 100 minutes for activation.

After completion of activation, the product was withdrawn from the calciner, cooled near to room temperature and rinsed with several portions of water to remove the potassium hydroxide.

When no more alkali was detected in the washings, the product was drained and dried in a hot air dryer at 110° C.

The results were as follows.

| | |
|---|---|
| Yield of activated carbon | 81% |
| Total sulfur | 90 ppm |
| Bulk density | 0.45 |
| BET specific surface area | 1750 m$^2$/g |

What is claimed is:

1. A method of producing activated carbon with a large surface area and a low sulfur content which comprises mixing coconut shell char with potassium hydroxide hydrate with a water content of 2 to 25 weight percent in a weight ratio of coconut shell char to potassium hydroxide hydrate of 1:2 through 1:6 and heat-treating the mixture at a temperature which is higher than the temperature at which the potassium hydroxide hydrate melts and is sufficiently high to cause activation of carbon, whereby said heat-treating step yields an activated carbon having a low sulfur content in the absence of any acid washing step for removing sulfur from the activated carbon.

2. The method of claim 1 wherein the heat-treatment is carried out at a temperature not lower than 480° C.

3. The method of claim 1 wherein said potassium hydroxide hydrate is previously melted by heating and said coconut shell char is added to the resulting melt.

4. The method of claim 1 wherein the product activated carbon has a total sulfur content of not more than 100 ppm.

* * * * *

UNITED STATES PATENT AND TRADEMARK OFFICE
CERTIFICATE OF CORRECTION

PATENT NO. : 5,064,805
DATED : November 12, 1991
INVENTOR(S) : TOSHIRO, Otowa

It is certified that error appears in the above-identified patent and that said Letters Patent is hereby corrected as shown below:

Title page, item [75] Inventor: "Yoshiro" should read
   --Toshiro--.

Title page, item [56] References Cited, U.S. PATENT DOCUMENTS (3,764,561) "Hishino et al" should read --Nishino et al--.

Signed and Sealed this

Fourteenth Day of September, 1993

Attest:

BRUCE LEHMAN

*Attesting Officer*        *Commissioner of Patents and Trademarks*